(No Model.) 2 Sheets—Sheet 1.

J. PANYARD.
PAPER TRIMMER AND GAGE BOARD.

No. 342,127. Patented May 18, 1886.

Witnesses.
Henry D Baker
Robert Weir

Inventor
Joseph Panyard (No Model.) 2 Sheets—Sheet 2.
J. PANYARD.
PAPER TRIMMER AND GAGE BOARD.
No. 342,127. Patented May 18, 1886.
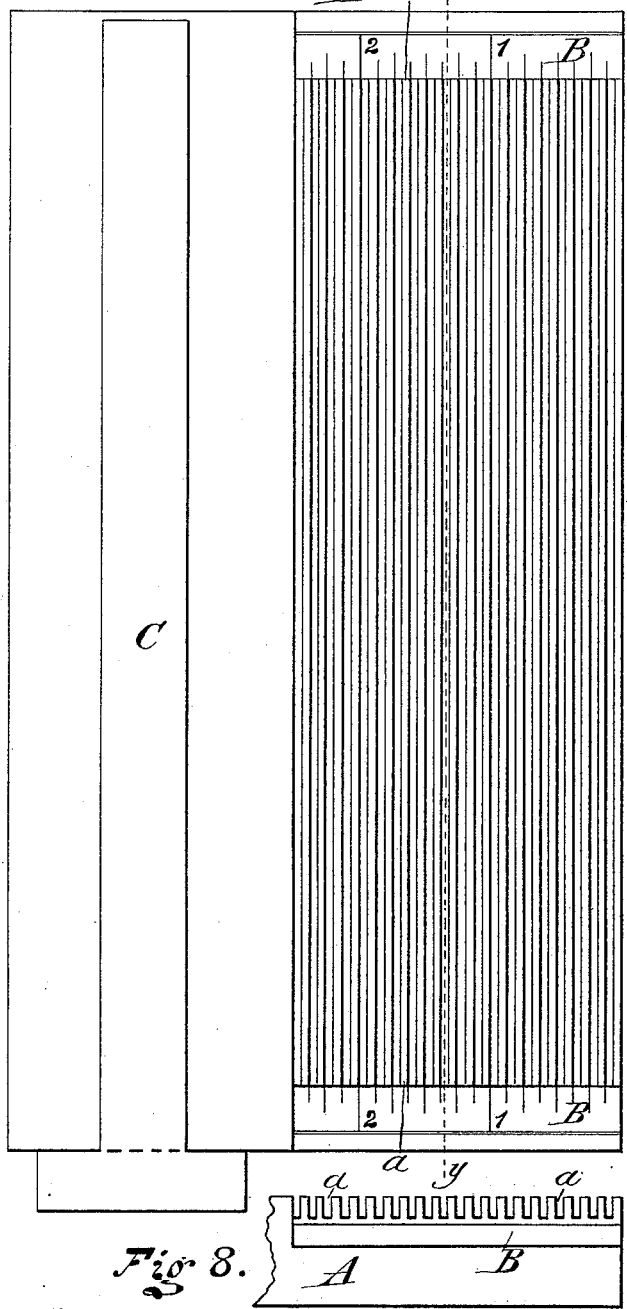
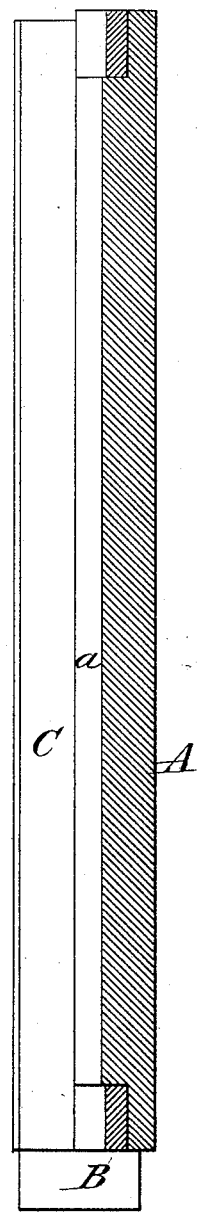
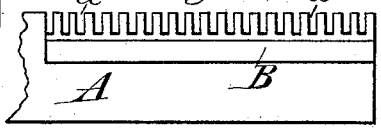
Witnesses.
Henry D Baker
Robert Weir,
Inventor.
Joseph Panyard

UNITED STATES PATENT OFFICE.

JOSEPH PANYARD, OF MUSKEGON, MICHIGAN, ASSIGNOR OF ONE-HALF TO HENRY D. BAKER, OF SAME PLACE.

PAPER-TRIMMER AND GAGE-BOARD.

SPECIFICATION forming part of Letters Patent No. 342,127, dated May 18, 1886.

Application filed December 10, 1885. Serial No. 185,305. (No model.)

*To all whom it may concern:*

Be it known that I, JOSEPH PANYARD, a citizen of the United States, residing at Muskegon, in the county of Muskegon and State of Michigan, have invented certain new and useful Improvements in Paper-Trimmers and Gage-Boards; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an improvement in paper-trimmers and gage-boards, the object of the invention being to facilitate the cutting or trimming of wall-paper, borders, &c., into any width required, so that the edges will be perfectly straight and parallel; and the invention consists in constructing the gage-board, on which the paper is laid to be pasted and cut, with a series of grooves extending the whole length of the board, and in providing each end of the board with a measuring-rule placed transversely across the board close to the end of the groove.

The invention also consists in providing the gage-board with a movable T-square, to the upper face of which is secured a sheet of rubber or other suitable material, which will afford a tractional surface for the corrugated wheel of the rotating cutter used with my machine; and the invention also embraces a trimmer having a circular rotating cutter, a lower straight cutter, which acts as a guide-plate by having its under portion formed to slide in the groove cut in the gage-board, and which is of sufficient length to insure steadiness to the device when in operation. The trimmer also has a rotating corrugated wheel, and generally a handle, whereby the device is moved forward and backward over the length of the gage-board in order to trim the paper; and the invention further consists in the construction and combination of parts, as will be hereinafter fully set forth.

Figure 1:
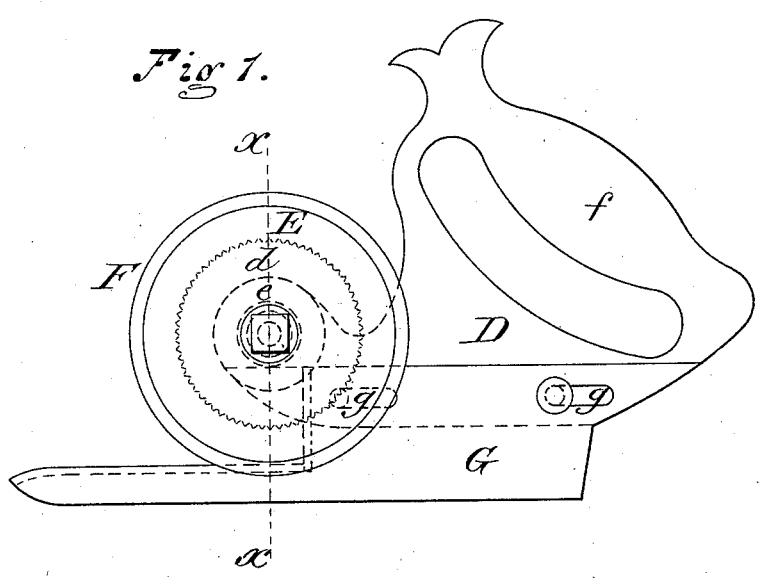
Figure 2:
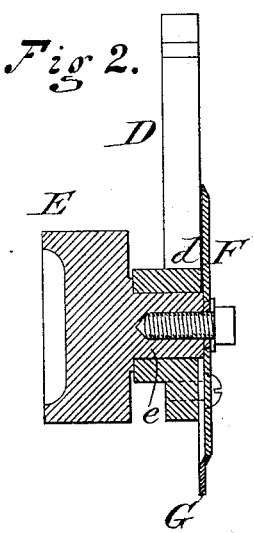
Figure 3:
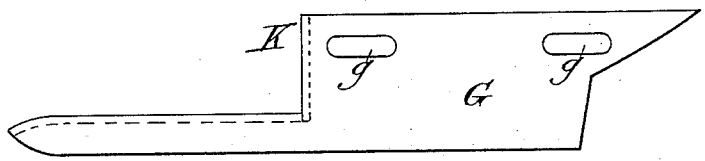
Figure 5:
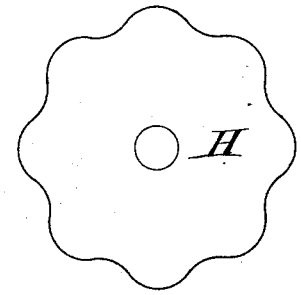
Figure 4:
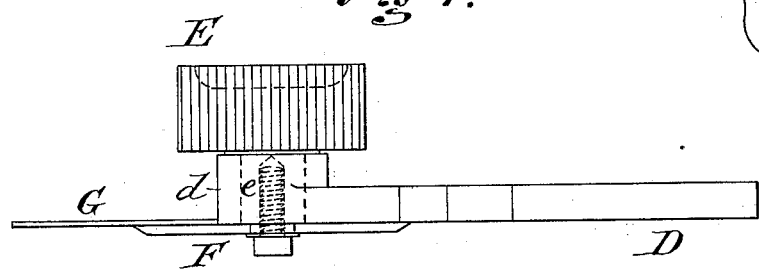

In the annexed drawings, illustrating my invention, Figure 1 is a side elevation of the improved trimmer which is used in my advice. Fig. 2 is a cross-section of the trimmer on the line $x\ x$ of Fig. 1. Fig. 3 is a detail view of the lower guide-plate of the trimmer. Fig. 4 is a top plan view of the trimmer. Fig. 5 represents a corrugated rotating cutter. Fig. 6 is a top plan view of the grooved gage-board and T-square. Fig. 7 is a section of the same on the line $y\ y$ of Fig. 6, and Fig. 8 is an end view of the gage-board and its measuring-rule.

Like letters of reference designate like parts in the several views.

A represents the gage-board, made of any convenient size. One portion of this board is left smooth, as shown in Fig. 6, while the other is constructed with a series of longitudinal grooves, $a$, these grooves being for the purpose of guiding the cutter in a straight line when the machine is in operation. The number of these grooves may be greater or less, as desired.

B B represent graduated rulers fastened to either end of the grooved portion of the board. The plane of the upper faces of these rulers is on a level with the bottom of the grooves or slightly below, as shown in Fig. 8. In order to allow the guide-plate of the cutter to travel the whole length of the board, a movable piece, C, in the shape of a T-square, covered on its upper face with a sheet of rubber or other elastic material, accompanies the gage-board and serves as a track for the wheel of the trimmer.

The trimmer which is preferably used in my device is constructed as follows: D represents the main body, provided with a handle, $f$, and having its front portion formed with a hub or bearing, $d$, which is pierced with a hole of sufficient size to receive the journal $e$ of a corrugated driving-wheel, E. This wheel E is preferably formed integral with its journal, and the journal is made of sufficient length to pass entirely through the hub $d$ and project slightly on the opposite side. The outer end of the journal is also provided with a shoulder, as seen in Fig. 2, to the face of which a circular rotating cutter, F, is secured by means of a set-screw or other suitable means, said shoulder being of such a size as to fit into the central aperture of the cutter. The cutter is beveled on the edge to form a knife-edge, and as the journal which carries the cutter extends out beyond the line of the bearing said cutter will clear the edge of the bearing and work with freedom when it is fastened securely in its place. The main portion D of the cutter is further provided with a guide-plate cutter, G, having slots *g g*, which allow the plate to be movable backward and forward, in order to obtain a sharp cutting-edge of the knife when it has been dulled by use. This plate G is set into the body of the trimmer sufficiently far to be flush with the inside or cutting edge of the circular cutter F, and it is preferably fastened to the main body by a set-screw passing through one of the slots *g*, and a pin passing through the other slot, which mode of fastening renders the plate easily adjustable. The forward or tongue portion, K, of the guide-plate is constructed with a sharp edge, which constitutes the under or lower cutter of the machine. The edge is beveled in a direction reverse to the bevel of the rotating cutter. (See Fig. 2.) This allows both cutting-edges to be brought close together in the manner required for the successful operation of the machine. The face of the main portion of the guide-plate—*i. e.*, the front above the tongue—is beveled also to allow the paper to be easily thrown off after it is cut.

In Fig. 5 is shown a modified form, H, of the rotating cutter. Instead of being circular, it may have a corrugated edge. This form is better adapted for trimming heavy paper.

In operating my machine the wall-paper, bordering, or other material to be trimmed is first cut to the required length and placed upon the smooth portion of the board in whatever quantity is desirable and convenient. One strip is then drawn over onto the grooved portion of the gage-board. It is next pasted and folded so that both ends meet each other, as is the customary practice in the paper-hanger's art. One side is then laid flush with the edge of the board, and the desired width to be cut is measured off on the measuring-rules at either end of the same. The lower gage-plate cutter of the trimmer is inserted in the groove or depression corresponding to the measurement on the rule. The movable T square or track is placed so that the corrugated driving-wheel will rest upon the upper elastic surface thereof. Power now applied to the handle of the trimmer will move the device forward throughout the entire extent of the groove in which it runs, and thus a perfectly straight strip will be cut from the paper; for as the corrugated driving-wheel revolves upon its elastic bed the cutter will be rotated, and the paper lying between the edges of the lower guide-plate and the rotating cutter will be quickly and neatly cut.

In the mode of operation just described I have taken wall-paper as an example; but it is evident that other material may be cut equally well.

Having thus described my invention, what I claim as new, and desire to secure by Letters Patent, is—

1. In a paper-cutter, a grooved gage-board, in combination with transversely-located measuring devices, substantially as and for the purpose shown and described.

2. In a paper-cutting device, a gage-board having a portion of its upper surface smooth and the remainder longitudinally grooved, the latter portion being provided with measuring-rules placed transversely across the ends of the grooves, substantially as shown and set forth.

3. In a paper cutter, the combination, with a gage-board constructed with grooves, in the manner described, of a trimmer consisting of a guiding-plate adapted to slide within the said grooves, a circular cutter, and a corrugated driving-wheel actuated by traction upon a smooth surface provided for the purpose, so as to rotate the cutter, as shown and described.

4. The combination, with a grooved gage-board and a movable track, of a trimmer having a guide-plate which works in the grooves and a rotating cutter actuated by a drive-wheel which rolls on the said track, as shown and set forth.

5. The grooved gage-board, measuring-rules, and movable track, in combination with a trimmer consisting of a guide-plate cutter, a rotating cutter, a corrugated driving-wheel working on the track to actuate the rotary cutter, and a handle for manipulating the device, all arranged and operating as shown and set forth.

6. In a paper-cutting device, a trimmer consisting of a main body, D, to which is adjustably secured a lower guide-plate cutter, G, and in which is journaled a rotary cutter, F, and a corrugated driving-wheel, E, actuated by traction on a suitable surface provided, said trimmer having also a handle, *f*, substantially as shown and described.

In testimony whereof I affix my signature in presence of two witnesses.

JOSEPH PANYARD.

Witnesses:
ROBERT WEIR,
CHAS. F. LATIMER.